United States Patent [19]

Angadiyavar et al.

[11] B 3,986,140

[45] Oct. 12, 1976

[54] 2,4,6 TRISUBSTITUTED PYRIDINE DYE LASERS

[75] Inventors: Channabasappa S. Angadiyavar, Bombay, India; Rangaswamy Srinivasan, Ossining, N.Y.

[73] Assignee: International Business Machines Corporation, Armonk, N.Y.

[22] Filed: Sept. 17, 1974

[21] Appl. No.: 506,916

[44] Published under the second Trial Voluntary Protest Program on February 3, 1976 as document No. B 506,916.

[52] U.S. Cl. .................. 331/94.5 L; 252/301.17; 260/297 R; 330/4.3
[51] Int. Cl.² ........................................... H01S 3/00
[58] Field of Search .................... 252/301.2 R; 331/94.5 L; 260/297 R

[56] References Cited
UNITED STATES PATENTS 3,864,644  2/1975  Lincoln et al. .................. 260/296 P

OTHER PUBLICATIONS

Snavely, Electro–Optical Systems Design, pp. 30–36 (Apr. 1973).

Barrio et al., J. Am. Chem. Soc. vol. 95, pp. 4891–4895 (July 25, 1973).

Primary Examiner—John D. Randolph
Attorney, Agent, or Firm—Hansel L. McGee

[57] ABSTRACT

New 2,4,6 trisubstituted pyridines are useful as laser dyes. These dyes are used in solution with a non-interfering solvent to form lasing media useful in dye lasers. When excited, these dyes have emission wavelengths which cover the spectrum from 410–570 nm. The violet and near ultra-violet regions of the visible spectrum are particularly well-served by the new compounds.

19 Claims, 1 Drawing Figure

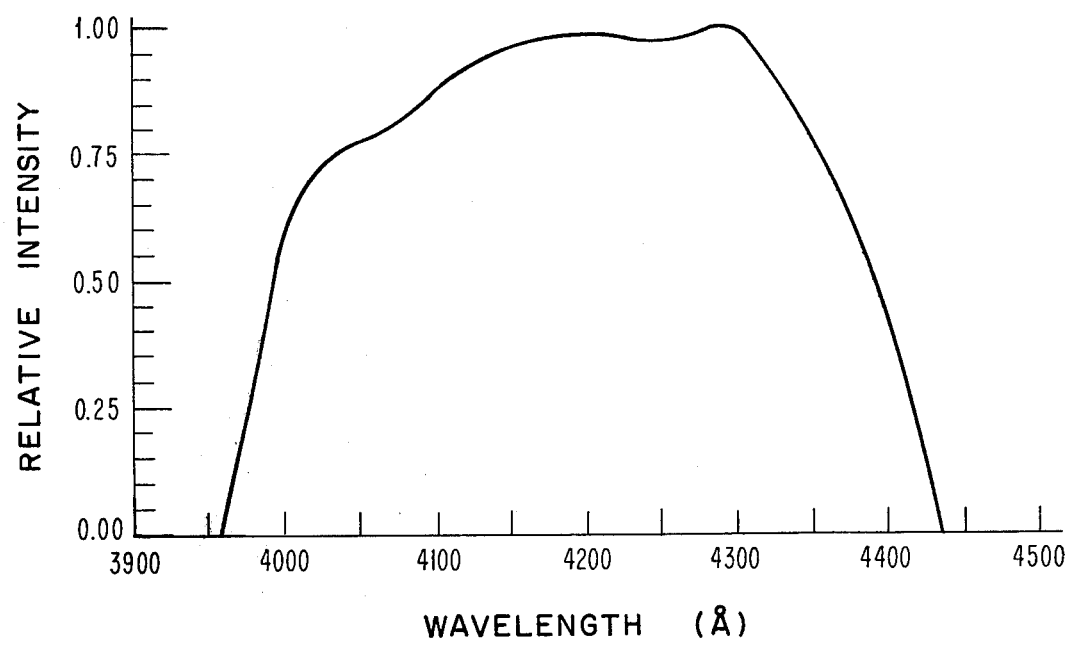

2,4,6 TRISUBSTITUTED PYRIDINE DYE LASERS

BACKGROUND OF THE INVENTION

1. Field of Invention

The invention relates to dye lasers; more particularly, it relates to the use of a new class of dyes as lasing media for organic dye lasers.

2. Description of the Prior Art

Organic dye lasers are known in the art and are exemplified by U.S. Pat. No. 3,493,885 to Peter P. Sorokin and commonly assigned to the assignee of the present invention. These dye lasers have certain advantages over the more conventional gas or solid state lasers. Because of their broad band fluorescence characteristics, they can be tuned to emit over a range of wavelengths. These lasers are also more economical than the gas or solid state lasers.

Several dyes are useful in dye lasers, such as metal phthalocyanines disclosed in the above-mentioned patent to Peter P. Sorokin, bridged enamine and allopolar cyanine dyes, U.S. Pat. No. 3,774,122 to Frank G. Webster and polymethine dyes as disclosed in U.S. Pat. No. 3,798,566 to William C. McColgin and Frank G. Webster. The above-mentioned dyes all emit in the near infra-red region of the spectrum, i.e., at about 600 nm. to about $1\mu$. Further these dyes are subject to photodegradation over a relatively short period of time, e.g., 7 to 10 days. The dyes of the present invention have been found not to photodegrade after use of periods of a month or more.

A particularly suitable laser structure adapted for organic dye liquid laser is described by Sorokin et al., IBM Journal, V. 11, p. 148 (1967). The described structure includes an optically resonant cavity containing a reservoir of a liquid laser medium or a liquid laser body dispersed within a thin-walled quartz cylinder. The reservoir is part of a closed system through which the dye solution is circulated during lasing operation. There is also provided a pumping source which subjects the dye to bombardment of electrons or illuminates it with a high energy source. Such pumping sources can be selected from giant pulse lasers, xenon and argon arc flash tubes as well as arc discharge tubes containing only air or other gaseous mixtures.

The above-mentioned prior art dyes placed in a suitable laser structure and pumped with an illuminating source such as a nitrogen laser emit light in the yellow, red and near infra-red region of the spectrum. Few if any known dyes when subjected as above emit light in the violet and near ultra-violet region of the spectrum. Those dyes which may be found to emit in the violet and near ultra-violet region do so weakly, e.g., they have outputs of less than 20 kilowatts. It is important to provide dyes which will have strong emission in the violet and ultra-violet region of the spectrum, e.g., outputs of 50 kilowatts or more.

Another suitable laser structure in which the laser dyes of the present invention can be used is that disclosed in U.S. Pat. No. 3,816,754, and patent application Ser. No. 458,144, to J. R. Lankard et al., and both being assigned to the same assignee as is the present invention. The above patent and patent application describe a tunable infra-red/ultra-violet laser. In FIG. 1 thereof, there is shown a pair of tunable dye lasers, wherein one is made to emit at a first frequency $f_L$, called the pump frequency, and the other emits a second frequency $f_P$. The two output beams $f_L$ and $f_P$ are combined by mirrors or prisms into a colinear beam, which is focused into a heat pipe oven containing an alkali metal vapor. Frequency $f_L$ creates a third frequency $f_S$ in the vapor via an electronic stimulated Raman effect. Frequency $f_P$ mixes with $f_S$ and $f_L$ to produce $f_R$, where $f_R = f_L - f_S \mp f_P$. Since $f_L - f_S$ equals a constant, K, the produced frequency $f_R = K \mp f_P$. Since the difference $K - f_P$ can easily be made quite small, a tuning range extending into the far infra-red is practicable. The sum $K + f_P$ extends the tuning range to higher frequencies, i.e., into the ultra-violet. To obtain frequencies in the ultra-violet range of the spectrum, laser dyes of the present invention may be used to generate the frequency $f_P$.

Accordingly, it is an important object of this invention to provide organic dyes which lase in the violet and near ultra-violet region of the spectrum.

It is a further object to provide a class of 2,4,6 trisubstituted pyridine dyes which are useful as lasing media.

The foregoing and other objects, features and advantages of the invention will be apparent from the following more particular description of a preferred embodiment of the invention, as illustrated in the accompanying drawing.

BRIEF DESCRIPTION OF THE DRAWING

In the drawing there is shown the output of a typical organic dye laser of the present invention.

SUMMARY OF THE INVENTION

In accordance with the invention there is provided a class of 2,4,6 trisubstituted pyridine dyes which are useful as lasing media. This class of dyes includes various individual dyes which, when suitably excited, lase in the violet and near ultra-violet region of the spectrum.

DESCRIPTION OF PREFERRED EMBODIMENTS

The objects of the present invention are obtained through the use of dye lasers having a reservoir means containing a laser dye solution and a pumping energy source to cause excitation in said laser dye thereby effecting stimulated emission of the solution. The dye solution comprises a lasing concentration of dye in a non-interfering solid or liquid host solvent (i.e., one that does not inhibit stimulated emission of a 2,4,6 trisubstituted pyridine).

The dyes useful in this invention can be represented by the structural formula:

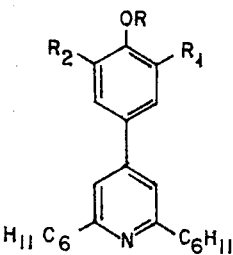

wherein R can be any alkyl grouping having from 1 to 6 C atoms, e.g., $CH_3$, $C_2H_5$, $C_3H_7$, $C_4H_9$, $C_5H_{11}$, $C_6H_{13}$, cyclo-$C_6H_{11}$, and $R_1$ can be H, $CH_3$, $C_2H_5$, F; $R_2$ can be H, $CH_3$, $C_2H_5$, F or $OCH_3$.

An illustrative synthesis of these compounds can be demonstrated by the synthesis of 2,6 dicyclohexyl-4-(p-ethoxyphenyl) pyridine.

A mixture of 15 grams of p-ethoxybenzaldehyde and 12 grams acetophenone is dissolved in 80 ml of ethanol and is added to 10 ml of a 10% NaOH solution. The mixture is stirred for 8 hours. A solid is separated as 4-ethoxychalcone. It is filtered and crystallized from alcohol. The crystals have a m.p. of 63°C.

About 5.8 grams of 4-ethoxychalcone is added to a hot mixture (heated to 160°C) of 10 grams of ammonium carbonate and 10 grams of formic acid. The mixture is treated for 2 hours while the temperature is gradually increased to 190°C. The reaction mixture is then cooled, poured into 30 ml of a 50% ethanol solution and allowed to stand. The solid which separates from the reaction mixture is 2,6-diphenyl-4-(p-ethoxyphenyl) pyridine. It is crystallized from ethanol and has a m.p. of 125°–126°C.

The 2,6 diphenyl-4-(p-ethoxyphenyl) pyridine is then dissolved in glacial acetic acid (20ml) to which 0.2g of Adam's catalyst is added. The compound is then hydrogenated at 3 atm with shaking for 4–5 hours. The catalyst and solvent were removed from the reaction mixture leaving 2,6-dicyclohexyl-4-(p-ethoxyphenyl) pyridine m.p. 106°C.

Other suitable starting materials which can be used in the above synthesis can be selected from p-methoxybenzaldehyde, 3,4,5 trimethoxybenzaldehyde, p-butoxybenzaldehyde, p-hexyloxybenzaldehyde, p-amyloxybenzaldehyde, and cyclohexyloxybenzaldehyde, to give the corresponding 2,4,6 trisubstituted pyridine dye. These dyes give the similar output and intensity as those shown in table 1 infra.

The dyes of the present invention are used in lasing concentrations, i.e. a concentration sufficient to promote, under appropriate conditions such as those mentioned herein, stimulated emission of the laser dye solution. Generally, concentrations of from about $10^{-6}$ to $10^{-3}$ molar are employed. The dyes are dissolved in a HCl solution preferably having a concentration of 0.05N and then dissolved in the non-interfering solvents in the above concentrations. Still wider variations in concentration can be used for particular operations, if desired.

Representative useful non-interfering solvents which do not inhibit stimulated emission are hydroxylic solvents which are miscible with water, such as methanol and ethanol, et al.

The present lasing media can be used in a variety of laser apparatus. Particularly useful laser structures for testing organic dye liquid laser media is that described by Sorokin et al., IBM Journal vol. 11, p. 148 (1967), and the tunable dye laser of Lankard et al., U.S. Pat. No. 3,816,754, described supra.

The dyes were tested in a dye laser similar to those mentioned in the above-stated references. The apparatus used herein comprised a nitrogen laser which transversely pumped the dyes with a 3371A. light, a quartz dye cell having polished end windows, and which is contained between two mirrors forming the optical lasing cavity for the cell. To analyze the output of the dye cell, a fast rise photodetector is used in conjunction with an oscilloscope. Alternatively, the light is focused onto a spectrometer and analyzed on a streak camera. This apparatus permits simultaneous temporal wavelength and intensity resolutions.

The following table illustrates the test results of several of the laser dyes of the present invention having the general formula:

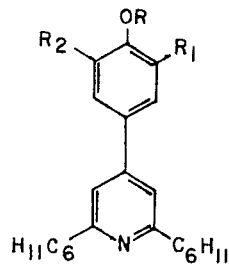

An ethanol:water solution of the dyes having a concentration of $1 \times 10^{-3}$ mol/l in 0.05N HCl is placed in the quartz cell and is transversely pumped with a one megawatt nitrogen laser having a 3371A. light output.

Table 1

| Example No. | Structure | m.p. °C | λ nm Excitation | λ nm Fluorescence | λ nm Laser | Laser Intensity |
|---|---|---|---|---|---|---|
| 1 | R = CH₃ R₁ = R₂ = H | 119 | 330 | 410 | 418 | Strong |
| 2 | R = C₂H₅ R₁ = R₂ = H | 106 | 330 | 408 | 418 | strong |
| 3 | R = CH₃ R₁ = F R₂ = H | 124 | 325 | 406 | 418 | strong |
| 4 | R = CH₃ R₁ = R₂ = OCH₃ | 58 | 330 | 464 | no | — |

The FIGURE depicts the general output of the dye lasers of this invention. It is seen that the output at the maximum corresponds to about 70 kilowatts. The lasers generally have a peak output in the range from 410–470 nm.

The invention has been described in detail with particular reference to certain preferred embodiments thereof, but it will be understood that variations and modifications can be effected within the spirit and scope of the invention.

What is claimed is:

1. A dye laser comprising an acidic laser dye solution and a pumping energy source operably coupled therewith and capable of producing stimulated emission of the dye solution, said dye solution comprising a lasing concentration in a non-interfering solvent, of a dye having the general structure as follows:

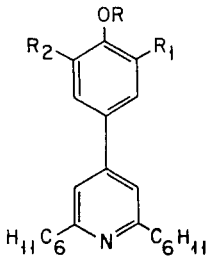

wherein R can be any alkyl group having from 1 to 6 C atoms; $R_1$ can be H, $CH_3$, $C_2H_5$, F, and $OCH_3$; $R_2$ can be H, $CH_3$, $C_2H_5$, F, or $OCH_3$; and $R_1$ can equal $R_2$.

2. A dye laser according to claim 1 wherein said dye is present in a concentration of about $10^{-3}$ to $10^{-6}$ molar.

3. A dye laser according to claim 1 wherein said dye has the following structure:

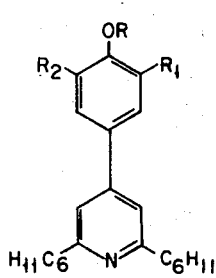

wherein $R = CH_3$; $R_1 = R_2 = H$.

4. A dye laser according to claim 1 wherein said dye has the following structure:

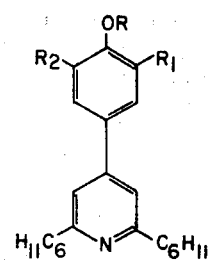

where $R = C_2H_5$; $R_1 = R_2 = H$.

5. A dye laser according to claim 1 wherein said dye has the following structure:

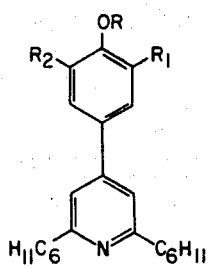

where $R = CH_3$; $R_1 = F$ and $R_2 = H$.

6. A dye laser according to claim 1 wherein said dye has the following structure:

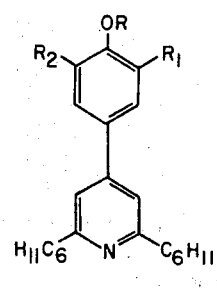

wherein $R = C_3H_7$, and $R_1 = R_2 = H$.

7. A dye laser according to claim 1 wherein said dye has the following structure:

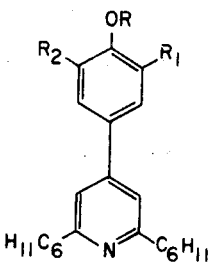

wherein $R = C_4H_9$, and $R_1 = R_2 = H$.

8. A dye laser according to claim 1 wherein said dye has the following structure:

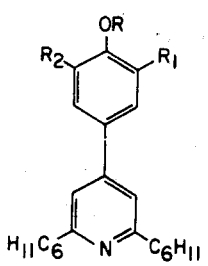

wherein $R = C_6H_{13}$, and $R_1 = R_2 = H$.

9. A dye laser according to claim 1 wherein said dye has the following structure:

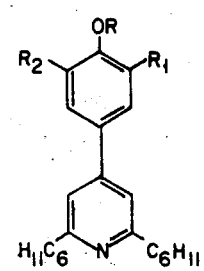

wherein $R = \text{cyclo-}C_6H_{11}$, and $R_1 = R_2 = H$.

10. A dye laser according to claim 1 wherein said dye has the following structure:

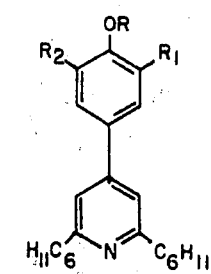

wherein $R = R_1 = R_2 = CH_3$.

11. A method of producing coherent laser emission in the operation of a dye laser in the wavelength range from about 410 nm to about 570 nm comprising the steps of:
a. placing in an optically resonant cavity and
b. optically pumping an acidic dye solution containing between about $10^{-3}$ to about $10^{-6}$ molar concentration of a lasing dye in a non-interfering solvent, said dye having a general structure as follows:

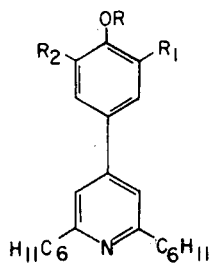

wherein R can be any alkyl group having from 1 to 6 C atoms; $R_1$ can be H, $CH_3$, $C_2H_5$, F, and $OCH_3$; $R_2$ can be H, $CH_3$, $C_2H_5$, F, or $OCH_3$; and $R_1$ can equal $R_2$.

12. A method according to claim 6 wherein said dye has the following structure:

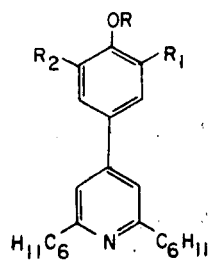

wherein $R = CH_3$, and $R_1 = R_2 = H$.

13. A method according to claim 6 wherein said dye has the following structure:

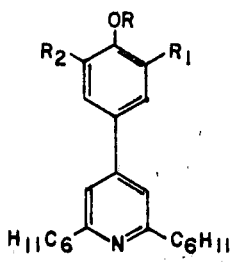

where $R = C_2H_5$, and $R_1 = R_2 = H$.

14. A method according to claim 6 wherein said dye has the following structure:

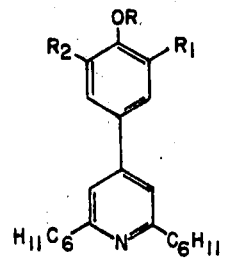

where $R = CH_3$, $R_1 = F$ and $R_2 = H$.

15. A method according to claim 6 wherein said dye has the following structure:

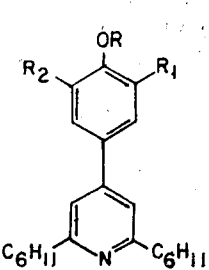

where $R = C_3H_7$, and $R_1 = R_2 = H$.

16. A method according to claim 6 wherein said dye has the following structure:

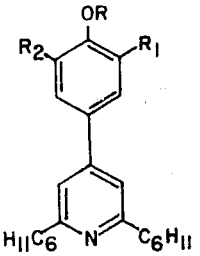

where $R = C_4H_9$, and $R_1 = R_2 = H$.

17. A method according to claim 6 wherein said dye has the following structure:

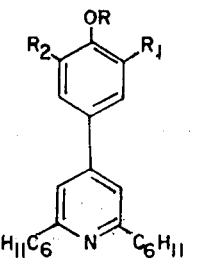

wherein $R = C_6H_{13}$, and $R_1 = R_2 = H$.

18. A method according to claim 6 wherein said dye has the following structure:

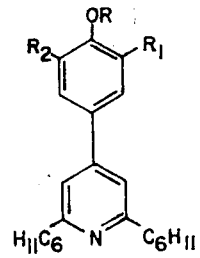

wherein $R = $ cyclo-$C_6H_{11}$, and $R_1 = R_2 = H$.

19. A method according to claim 6 wherein said dye has the following structure:

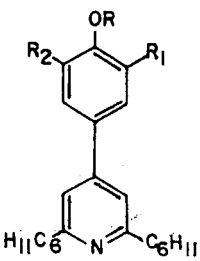

wherein $R = R_1 = R_2 = CH_3$.

* * * * *